Dec. 19, 1961  M. MINSKY  3,013,467
MICROSCOPY APPARATUS
Filed Nov. 7, 1957

INVENTOR.
MARVIN MINSKY
BY Amster & Levy
ATTORNEYS

United States Patent Office 3,013,467
Patented Dec. 19, 1961

3,013,467
MICROSCOPY APPARATUS
Marvin Minsky, 44 Bowdoin St., Cambridge, Mass.
Filed Nov. 7, 1957, Ser. No. 695,107
4 Claims. (Cl. 88—14)

My invention relates to a new and improved electronic microscope apparatus and to a novel apparatus for microscopy.

According to my invention, I utilize an optical system including a means for producing a point source of light. Light from this point source is focused upon a specimen to be enlarged to illuminate a point observation field included in the specimen. The illuminated point is then focused as an image of the point upon a pinhole aperture, and the light intensity of the image measured by a photosensitive device. While the optical system remains fixed, means are provided to move the specimen in a selected pattern across the focal point of illumination so that a selected area of the specimen traverses and is examined by the point of light. This scanning pattern traversed by the specimen is reproduced by an identical scanning pattern or raster upon a display device, such as a cathode ray tube, to which is also fed the signal from the photosensitive device. The raster area greatly exceeds the selected area of the specimen. As a result, an image of the second specimen area is reproduced on a highly enlarged scale in the raster of the cathode ray tube.

An object of the invention is to provide a microscope system in which simple objectives may be used, at the same time resulting in a resolving power unattainable in conventional microscopic apparatus and by conventional microscopy methods.

Another object of the invention is the provision of a microscopic optical system capable of rejecting all scattered light except that emanating from the central focal point, i.e. the illuminated point of the specimen. Such high selectivity of light reduces blurring, increases effective resolution, and permits unusually clear examination of thick and scattered specimens.

A further object of the invention is the provision of a microscopic optical system which permits the use of new and simplified techniques in the application of variable aperture stops and optical contrast methods.

Additional objects and advantages of the invention will be apparent in the course of the following specification when taken in conjunction with the accompanying drawings, in which.

In its broad aspects, the invention herein comprises two novel systems: (1) the optical system, which may be designated as a "double focusing" system illuminating a point on the specimen and for reproducing an image of an illuminated point of the specimen at a pinhole aperture; and (2) the mechanical-electrical system for moving the specimen in a scanning pattern to traverse the focal point of illumination and to produce a synchronized, identical scanning pattern on the display device. This second system may be termed a "stage scanning" system. For clarity, each of these systems will be separately discussed.

*Double focusing optical system*

Figure 1:
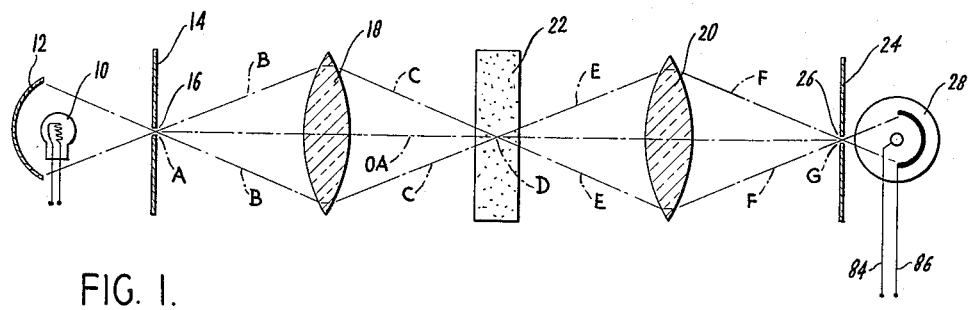
FIG. 1 is a diagrammatic view of an optical system arranged in accordance with my invention.
Figure 3:
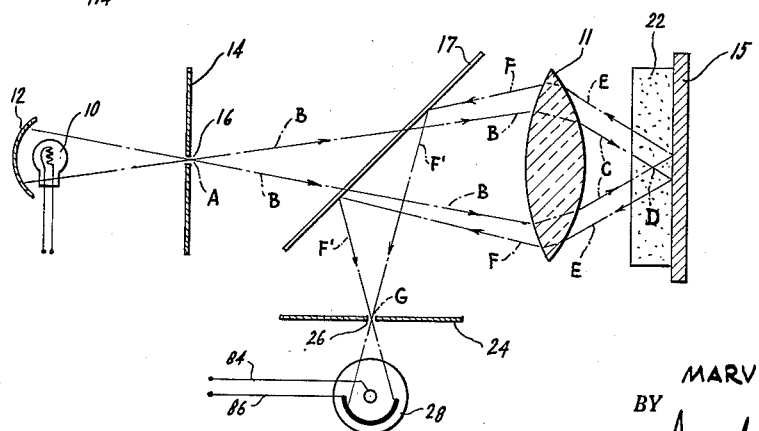

FIGS. 1 and 3 respectively show two embodiments of the optical system of the microscope both of which function in an identical manner and can produce identical results.

FIG. 1 shows, by way of illustration, a light source 10 which may be in the form of an electric light bulb, or other light source suitable for use in microscopy. The bulb 10 has the usual reflector 12.

Mounted in front of the light source 10 is a screening device, which, in its simplest form may be a plate or wall 14 having a pinhole aperture 16 in registry with the light source 10. The structure described above is shown for clarity of illustration, it being understood that any suitable means for producing light from a point source may be utilized according to the invention. It is desirable, however, to obtain the closest possible approximation of a point source of light, the power of resolution of the microscope depending upon the degree to which a geometric point can be approximated.

The "double focusing" system in this embodiment of the invention is provided by a pair of objective lenses 18 and 20. The lens 18 focuses the light emanating from the pinhole aperture 16 upon the specimen 22 to produce an illuminated point on said specimen, and the lens 20 focuses this illuminated specimen point upon a second pinhole aperture 26.

The objective lens 18 is shown as a symmetric double-convex lens (but may be any simple or complex focusing device) located between the plate or wall 14 and the specimen 22. The second lens 20 is of similar shape and is located on the opposite side of the specimen 22, between said specimen and a second plate or wall 24. The plate or wall 24 contains a pinhole aperture 26 which is in alignment with the aperture 16 of plate 14.

Located behind the plate or wall 24, in registry with the pinhole aperture 26, is a photo-sensitive device 28, which may be a photo-electric cell. The device 28 is capable of measuring the intensity of the light passing through the pinhole aperture 26.

The point source of light A, produced at the pinhole aperture 16 becomes a divergent beam indicated by the extreme rays B, B in the path of which the lens 18 is located. In passing through the lens 18, the divergent beam becomes a convergent beam indicated by the extreme rays C, C, this beam converging to its focal point D. Expressed in different terms, the lens 18 produces an axial cone of light B, B having an apex D. The apex or focal point D, approximates a point of light, depending upon the size of the light source 16. The part of the specimen 22 to be examined is located at this focal point D, so that there is produced a point of illumination on the desired part of the specimen 22.

The illuminated point D of specimen 22 becomes a divergent beam defined by extreme rays E, E, which passes through the second objective lens 20 to become a convergent beam defined by extreme rays F, F. The beam F, F converges to a focal point G, which may be regarded as the apex of the axial cone of light F, F. The pinhole aperture 26 of plate 24 is located at this focal point G, and the light passing through the aperture 26 is received by the photo-electric cell 28 and converted to an electrical current which is fed to the cathode ray tube. The intensity of the point of light D on the specimen 22 is therefore reproduced as a light spot of the same relative intensity on the cathode ray tube, as described hereinafter.

Under the heading "Stage Scanning System" below, I shall describe means for scanning an area of the specimen with the point of illumination D. This is accomplished by moving the specimen 22 relative to the light spot D in a designated scanning pattern, all other portions of the optical system remaining fixed and immovable. Means are also provided for producing an identical scanning pattern or raster on the cathode ray tube, so that a pointby-point image of the scanned specimen area is reproduced on the cathode ray raster.

The optical axis of the system shown in FIG. 1 is represented by the line O A. The pinhole apertures 16 and 26, and the centers of lenses 18 and 20, all lie upon the optical axis O A. Thus, the point source of light A, and the specimen point of illumination D both originate on the optical axis O A, while the point image G terminates on the optical axis. It will therefore be observed that all of the light rays accepted by the photo-electric cell 28 must pass through the specimen 22 at point D on the optical axis, and pass again through the optical axis at point G. Light scatterend from points other than the point of specimen illumination D is rejected from the optical system to an extent never heretofore realized. Such scattered rays may pass through and be refracted by lens 20, but will not be directed to the pinhole aperture. Rather, the defracted rays will strike the body of plate 24, and be rejected from the optical system. Such rays can reenter the optical system only by again being scattered, and the possibility of their being scattered along a line through point D on the optical axis O A is exceedingly remote. The second pinhole aperture 26 increases the optical resolution of the system by its action of squaring the intensity pattern distribution of the image diffraction. It can be shown that this results in a sharpened central diffraction zone with reduced high order zones.

This high degree of selectivity afforded by the optical system results in a minimum of blurring, increase in signal-to-noise ratio, increase in effective resolution, and the possibility of high resolution light microscopy through unusually thick and highly-scattered specimens.

It will also be apparent to those skilled in the art that the double focusing feature of the optical system enables the use of extremely simple lenses as compared to the usual microscopic objectives. In conventional microscopy, each lens is required to bring into focus simultaneously every point in the field of view. Such a requirement has never been fully realized when the field of view comprises an area. In the optical system of the instant invention, however, the lenses are merely required to bring the light originating at a single point on the optical axis into focus at another point on the optical axis. The lens design is thus relatively simple and the lenses need only be corrected for spherical abberation and possibly for longitudinal chromatic abberation. The usual microscope lens corrections for coma, astigmatism, curvature of field, field distortion, and lateral chromatic abberation may be dispensed with.

Because of the simple design of the lenses, microscopic objectives for the optical system may be constructed with considerably higher relative apertures and with higher resolving power than has hitherto been attainable. The lenses can be made of larger size than conventional microscope lenses with greater working distances.

Since the entire field of view of the optical system constitutes a single point, the system has the novel advantage of affording a potential aperture stop location at every position along the optical axis. Thus a continuously variable aperture stop can be provided by merely moving an annulus of fixed size along the optical axis. This eliminates the necessity of using an annulus of adjustable size, in the nature of an iris diaphragm, such as is utilized in conventional systems, and allows for continuous variation in the effective aperture of the annulus without interruption of work.

Many of the techniques for microscopic investigation may be materially simplified in accordance with the present invention, as will occur to those skilled in the art. In that the present system involves the use of only one set of rays, that is the rays passing through any one point on the optic axis, it is possible to produce complex contrast effects with comparatively simple equipment. Any contrast techniques which will work on the very small region can be used to investigate an extended specimen. This is in marked contrast to the use of conventional systems which require special techniques and equipment to investigate a large area.

Specifically, in conventional techniques the contrast system is to operate in exactly the same manner simultaneously in all points of the field of view wherein optical conditions vary markedly. This often requires great precision and in many systems necessitates the use of special stops situated at inconvenient and often inaccessible locations of the optical system. Illustrative of the advantages realized by the present system are the facility for dark field microscopy. For example, in the system illustrated in FIG. 1, dark field investigation may be achieved by placing an appropriately shaped stop anywhere between the pinhole aperture 16 and the objective 18 and a complementary aperture at a corresponding position between the objective 20 and the pinhole aperture 26.

Those skilled in the art will appreciate that the optical system of my invention has the property that every plane across the optical axis is a potential pure aperture stop, whereas in a conventional system, there are never more than a very few such locations. Now in a conventional system, if it is desired to introduce special purpose aperture stops, such as are used for phase-contrast or dark-field microscopy, it is required that said special purpose stops be introduced in one of the very few pure aperture plane locations, and this imposes severe requirements of precision on the manufacture of the stops, and in some cases results in inconvenient or impossible requirements on the lens designs. If more than a few different stops are required, then there are simply not enough such locations in a conventional microscopic system for placement of the stops. In the system of this invention, it is possible to provide for any number of stops by simply lengthening the distance between the elements of the system. This results in an instrument of unprecedented flexibility and convenience.

Because of the fact that the optical system is identical for each point of the field of view being scanned, this system is especially well suited for making quantitative studies of the optical properties of the specimen. In a conventional system, the optical properties of the system may vary from point to point of the field of view. This makes it necessary to calibrate separately the optical properties of the microscope for many points of the field of view, if accurate measurements are to be made. In my system, the identical system is used at each point of the specimen, making point-to-point calibration unnecessary. Still other advantages will occur to those skilled in the art.

FIG. 3 shows a modified arrangement of the optical system in which a single objective 11 is used, instead of the two objectives 18 and 20. In this arrangement, the specimen 22 is mounted upon the reflective surface of a mirror 15. A beam-splitting plate 17 is interposed between the collimating plate or wall 14 and the lens 11. The reflective surface of the beam-splitting plate 17 faces the lens 11, while the transparent surface of plate 17 faces the pinhole aperture 16.

The light reflected from bulb 10 by reflector 12 is colimated by the pinhole aperture 16 of plate 14 to provide the point source of light A. The divergent beam B, B passes through the beam splitting plate 17 and then through lens 11, becoming convergent beam C, C. The focal point D of the beam C, C is located on the specimen 22, and becomes the divergent beam E, E which is reflected from the mirror 15 back through the lens 11. Lens 11 forms the convergent beam F, F which is reflected perpendicularly from the beam-splitting plate 17 as indicated by beams F', F' which converge to their focal point G at the pinhole aperture 26 of plate 24. The photo-electric cell 28 is located in alignment with the aperture 26 to measure the intensity of the light passing therethrough.

While the beam-splitting plate is positioned at a 45° angle to the vertical in order to reflect the beam F', F' perpendicularly to the beam B, B it may still be considered that the ultimate focal point or image point G is located on the optical axis of the system, and the pinhole aperture 26 operates as previously described to prevent scattered rays not originating at point D from being received by the photoelectric cell 28.

*Stage scanning system*

Figure 2:
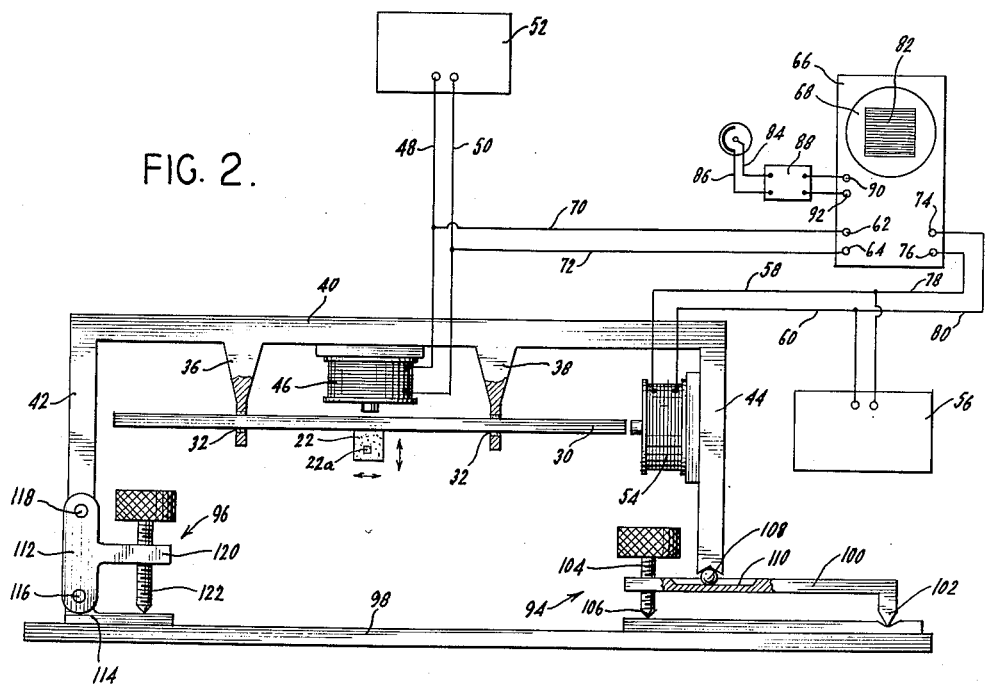
FIG. 2 is an elevational view of the apparatus utilized in scanning the specimen, portions of said apparatus being broken away to reveal inner construction, and the electrical components being shown diagrammatically; and, FIG. 3 is a diagrammatic view of a modified form of optical system in accordance with my invention.

FIG. 2 shows the structure for producing the "stage scanning," in which the specimen 22 is moved in a scanning pattern relative to the optical system. While the invention herein contemplates the use of many and varied types of scanning patterns, the simplest and most convenient form appears to be the usual form of oscilloscope raster composed of parallel horizontal lines. The structure shown in FIG. 2 is therefore illustrated as a preferred embodiment capable of producing a scanning pattern of the point of light on the specimen which corresponds to this raster. That is to say, the specimen is moved rapidly in both a horizontal and vertical direction in such a manner that it traverses the light beam focal point in synchronization with the oscilloscope raster.

In FIG. 2, the specimen 22 is shown mounted on a tuning fork 30 or other plate or member capable of vibrating at an ascertained frequency upon being excited. The tuning fork 30 is suspended at its nodes from depending arms 36, 38 of a frame 40. The frame 40 is L-shaped as shown, having terminal legs 42, 44. An electromagnet 46 is fixedly mounted on frame 40, adjacent to and above the center of the tuning fork 30, the electromagnet 46 being connected by leads 48, 50 to an oscillator 52.

The electromagnet 46 is operable under the influence of the oscillator 52 to excite the metal plate 30 at its natural frequency causing the specimen 22 to vibrate in a vertical direction. However excitation of the plate 30 at the natural frequency is not essential and in some instances it may be desirable to adjust the frequency of excitation.

A second electromagnet 54 is mounted on the frame 40, as on the frame leg 44 shown in FIG. 2, closely proximate to, and facing one end of the plate 30. The energizing circuit for this electromagnet 54 is fed through a saw-tooth oscillator 56 by leads 58 and 60. The saw-tooth oscillator 56 functions to reciprocate the entire plate 30 horizontally, this horizontal movement combining with the vertical vibratory movement of plate 30 to produce a scanning pattern over a selected area of the specimen 22. This scanned area is indicated schematically and on an enlarged scale as numeral 22a in FIG. 2. The horizontal motion of plate 30 is dampened by the action of viscous damping material 32 which lines the areas of the depending frame arms 36 and 38 upon which the member 30 is suspended.

The energizing circuit between the oscillator 52 and electromagnet 46 is connected by leads 70, 72 in parallel to the vertical input terminals 62, 64 of an oscilloscope 66 having a cathode ray tube 68. Similarly, the energizing circuit for the electromagnet 54 is connected in parallel to the horizontal input terminals 74, 76 of oscilloscope 66 by leads 78, 80. There is thus produced on the face of cathode ray tube 68 a raster 82, the vertical and horizontal components of which are synchronized to the vertical and horizontal movement of the specimen 22. The vertical and horizontal scanning amplitudes of the cathode ray tube raster can be made very much greater than the corresponding scanning amplitudes of the illuminated point field, as may be appreciated by comparing the dimensions of raster 82 with those of the specimen area 22a. This results in great magnification of the specimen area when an image thereof is reproduced within the boundaries of the raster.

To supply the signal to the raster 82, the leads 84, 86 of the photo-electric cell 28 are connected through an amplifier 88 to the terminals 90, 92 of the cathode ray tube grid circuit. Thus, the intensity of the point of light at any particular part of the scanned specimen area is reproduced by the cathode ray spot at the corresponding position on the raster 82, and a highly magnified image of the specimen area is thereby reproduced on the cathode ray tube.

In the "stage-scanning" system described, there is no necessity that the plane of the specimen being examined be perpendicular to the optical axis of the instrument or to the mount. In fact, the motion of scanning may be made to include a component along or parallel to the optical axis, limited only to the working distance of the objectives. This is a feature not found in conventional microscopes.

The scanning structure should also include adjustment means for selecting an area of the specimen to be scanned. Such adjustment means may be of any type suitable to move the frame 40 vertically and horizontally. One such means is shown in FIG. 2, as including a vertical adjustment member 94 and a horizontal adjustment member 96, both mounted on a flat base 98.

The vertical adjustment member 94 is in the form of an elongated horizontal member 100 having at one end a pointed depending leg 102 resting upon the base 98, and an adjusting screw 104 turnably mounted at the other end. The adjusting screw 104 has a pointed end 106 which engages the base 98. The bottom end of frame leg 44 is shaped to receive a ball 108 which is mounted to roll along a slot 110 in the top surface of the horizontal member 100. The screw 104 may be turned in either direction to raise or lower its adjacent end of the horizontal member 100 and thereby to raise or lower the frame 40.

The horizontal adjustment member 96 includes a link 112 which is pivoted at its lower end to a fixed base extension 114 by pivot 116. The top end of the link 112 is connected to the bottom of frame leg 42 by pivot 118. The link 112 has a central perpendicular arm 120 in which an adjusting screw 122 is vertically mounted. The bottom pointed end of screw 122 rests upon the base 98. Turning of the screw 122 upwardly or downwardly in the arm 120 will cause the link 112 to pivot angularly, which pivoting movement causes horizontal movement of the frame 40. This horizontal movement of frame 40 is permitted by the rolling movement of ball 108 in the slot 110.

The term "light" in this description and in the appended claims is intended to be broadly construed since my device may employ ultra-violet light, provided, of course, that appropriate objective lenses capable of focusing such radiation upon an irradiated point of the specimen are employed. In this manner it is contemplated that the present invention may be used to examine an internal portion of a specimen which is opaque to visible radiation.

While preferred embodiments of the invention have been shown and described herein, it is obvious that numerous additions, changes and omissions may be made in these embodiments without departing from the spirit and scope of the invention as defined by the claims.

What I claim is:

1. In a picture-producing device including means for focusing a beam of radiation on a specimen, a radiation detector adapted to receive said beam of radiation after the latter impinges on said specimen and to produce an output proportional to the intensity of radiation thus received, means for tracing images on a raster pattern having mutually transverse tracing components, and means connecting said image-tracing means to receive the output of said radiation detector to reproduce images proportional in intensity to the output of said radiation detector, a support for said specimen, means mounting said specimen support for movement in two mutually transverse directions, a pair of means each adapted to vibrate said specimen support in a separate one of said mutually transverse directions for scanning said beam of radiation over an area of said specimen, means connecting one of said vibrating means for synchronization with one of said tracing components and the other of said vibrating means for synchronization with the other of said tracing components to synchronize the scanning vibrations of said specimen support with said raster pattern.

2. A picture-producing device comprising a support for a specimen, means for focusing a beam of radiation on said specimen, a radiation detector adapted to receive said beam of radiation after the latter impinges on said specimen and to produce an electrical output proportional to the intensity of radiation thus received, an oscilloscope having horizontal and vertical inputs, means connecting said oscilloscope to the output of said radiation detector to reproduce images proportional in intensity to the output of said radiation detector, means mounting said specimen support for movement in two mutually transverse directions, a pair of electrically driven means each adapted to vibrate said specimen support in a separate one of said mutually transverse directions for scanning said beam of radiation over an area of said specimen, means connecting one of said vibrating means to said horizontal input and the other of said vibrating means to said vertical input in a manner to synchronize the scanning vibrations of said specimen support with the raster pattern of said oscilloscope.

3. A picture-producing device comprising a support for a specimen, means for focusing a beam of radiation on said specimen, a radiation detector adapted to receive said beam of radiation after the latter impinges on said specimen and to produce an electrical output proportional to the intensity of radiation thus received, an oscilloscope having horizontal and vertical inputs, means connecting said oscilloscope to the output of said radiation detector to reproduce images proportional in intensity to the output of said radiation detector, means mounting said specimen support for movement in two mutually transverse directions, a pair of electrically driven means each adapted to vibrate said specimen support in a separate one of said mutually transverse directions for scanning said beam of radiation over an area of said specimen, means connecting one of said vibrating means to said horizontal input and the other of said vibrating means to said vertical input in a manner to synchronize the scanning vibrations of said specimen support with the raster pattern of said oscilloscope, and electrical driving means adapted to drive said vibrating means at frequencies high enough to produce a sustained image of the scanned area of said specimen on said oscilloscope.

4. A picture-producing device comprising a support for a specimen, means for focusing a beam of radiation on said specimen, a radiation detector adapted to receive said beam of radiation after the latter impinges on said specimen and to produce an electrical output proportional to the intensity of radiation thus received, an oscilloscope having horizontal and vertical inputs, means connecting said oscilloscope to the output of said radiation detector to reproduce images proportional in intensity to the output of said radiation detector, means mounting said specimen support for movement in two mutually transverse directions, said specimen support being fabricated of a magnetically susceptible material, a pair of electromagnets each positioned to vibrate said specimen support in a separate one of said mutually transverse directions for scanning said beam of radiation over an area of said specimen, means connecting one of said electromagnets to said horizontal input and the other of said electromagnets to said vertical input in a manner to synchronize the scanning vibrations of said specimen support with the raster pattern of said oscilloscope, and electrical oscillator means connected to drive said electromagnets and capable of frequencies high enough to produce a sustained image of the scanned area of said specimen on said oscilloscope.

References Cited in the file of this patent

UNITED STATES PATENTS

| | | |
|---|---|---|
| 2,158,391 | Wise | May 16, 1939 |
| 2,257,774 | Von Ardenne | Oct. 7, 1941 |
| 2,661,902 | Wolff et al. | Dec. 8, 1953 |
| 2,731,202 | Pike | Jan. 17, 1956 |
| 2,775,159 | Frommer | Dec. 25, 1956 |
| 2,791,697 | Dell | May 7, 1957 |
| 2,847,162 | Meyer | Aug. 12, 1958 |